INVENTOR
ALLAN A. ISEN

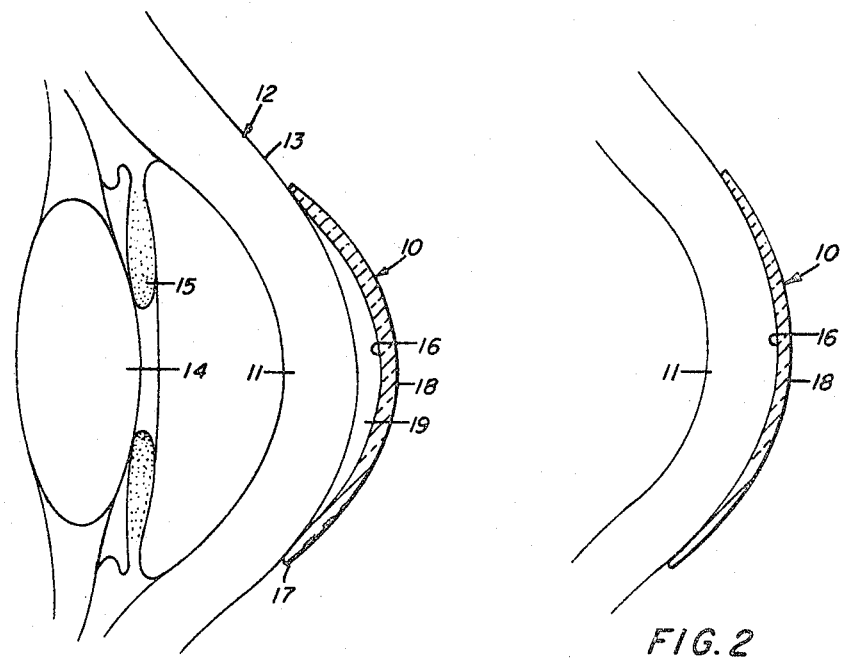
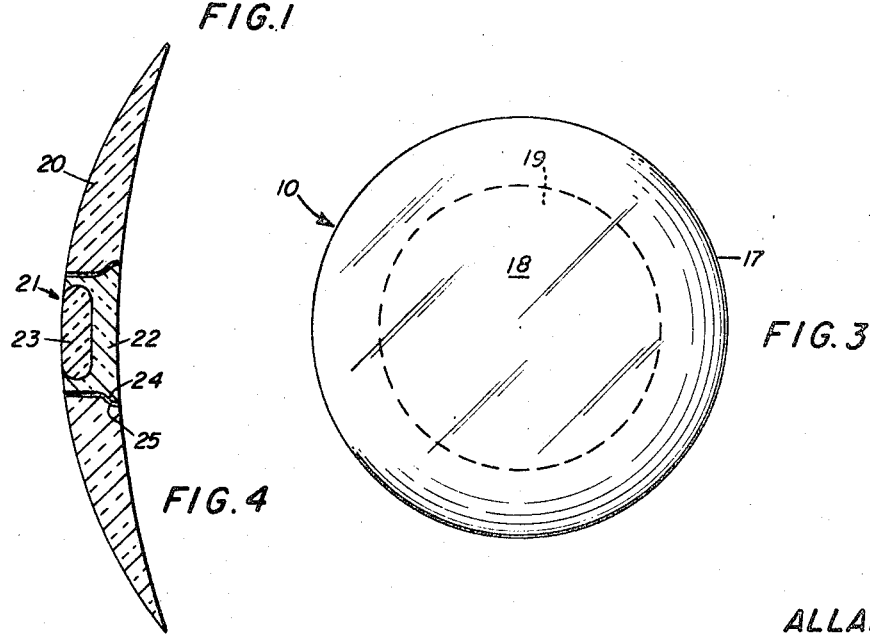

INVENTOR
ALLAN A. ISEN

United States Patent Office 3,488,111
Patented Jan. 6, 1970

3,488,111
HYDROPHILIC HYDROGEL CORNEAL CONTACT LENS WITH HARD CENTRAL INSERT
Allan A. Isen, Buffalo, N.Y., assignor to National Patent Development Corporation, New York, N.Y., a corporation of Delaware
Filed Mar. 16, 1967, Ser. No. 623,598
Int. Cl. G02c 7/04
U.S. Cl. 351—160                                     1 Claim

ABSTRACT OF THE DISCLOSURE

A contact lens fabricated of hydrophilic hydrogel material which undergoes a change in linear dimensions when passing from the anhydrous to the hydrated state, is ground to shape in the anhydrous condition in accordance with measurements which take in account aforementioned change to provide a more accurate fit of the lens when worn in the hydrated state. The lens is provided with a central insert of hard optical material.

---

This invention relates to optical devices, and more particularly to corneal contact lenses.

The early contact lenses were made of optical glass or other hard substances such as transparent acrylic or other similar resins. However, for most people it was impossible to wear these lenses for any length of time and certain people found that their use was so uncomfortable that they abandoned the wearing of contact lenses altogether.

Attempts to alleviate the discomforts caused by wearing lenses fabricated of hard materials included a reduction in the size of the lenses to the extent that they covered only the corneal area rather than extending over the limbal area and experimenting with making the concave surface of the lens with radii either greater or less than the radius of curvature of the cornea. Attempts have also been made to increase the wearing time for these lenses by the substitution of soft flexible transparent materials.

However, none of these expedients have produced a contact lens which have complete comfort in all eye movements and can be worn without eventual effects to the cornea. This is because none of the proposed materials is compatible with the corneal tissue and its' metabolism. As far as is known, it is believed that the human eye utilizes enzymes, oxygen and carbohydrates and in the process gives off waste products including carbon dioxide, water and lactic acid. It is apparent, therefore, that there is a continuous exchange of gaseous and liquid products over the entire area of the interface between the cornea and the atmosphere and in all of the prior art contact lenses in existence at this time this exchange can only take place at the margins of the lens. To facilitate this, proposals have been made to provide minute ducts across the concave surface of the lens or by changing the radius of curvature to otherwise facilitate the passage of these materials.

However, it has now been discovered that a corneal contact lens fabricated of cross-linked hydrophilic polymer as disclosed in U.S. Patents Nos. 2,976,576 and 3,220,960 can be worn without discomfort for much longer periods of time than lenses made of other materials previously known and with substantially no affects of any kind to the eye.

It is known that considerable numbers of people have achieved constant wear of contact lenses made with the material disclosed in the aforementioned patents, which for the sake of convenience may be described as a hydrophilic polymer. This may be due to the fact that the material is semipermeable and appears to be permeable to lachrymal fluids so that these fluids can pass directly out into the atmosphere over the entire surface of the cornea instead of having to travel outwardly under the lens to be discharged at its peripheral edges.

Another advantage possessed by this material is that its index of refraction is 1.42 when fully hydrated, this state being its condition when worn. This index of refraction compares with 1.39 for the human cornea; 1.33 for water; 1.335 for lachrymal fluids; 1.49 for conventional acrylic plastic lenses and 1.52 for glass. Since aberration is caused when light passes from one medium into another and its amount increases with an increase in the difference between the indices of refraction of the two mediums, it is obvious that there will be less aberration when using the hydrophilic polymer than is the case with hard plastic lenses, where the light passes through two different optical media before entering the eye through the cornea. These media are hard plastic, index of 1.49, water (tears) index of 1.33, and then to the cornea, index 1.39. In the case of the hydrophilic contact lens, the light passes from index 1.42 of the lens directly to index of 1.39 of the cornea.

With the use of a corneal contact lens made of the aforementioned hydrophilic polymer material it has been found that vision with these lenses is excellent if the inside surface of the lens is designed so that after it has been applied to the cornea, and has shaped itself to the cornea, the resultant front surface can be spherical or near spherical and the adherence will cause the lens to center on the cornea and maintain the position.

It has also been found that contact lenses covering the corneal and scleral portions of the eye can be made from the materials disclosed in the aforementioned patents which clinical experiments indicate can be continuously worn without discomfort or ill effects for indefinite periods of time.

It has also been found that for certain ranges of optical correction which normally require indices of refraction found only in optical glass or hard plastic, these hard substances may successfully be incorporated in a lens primarily comprised of the hydrophilic hydrogel materials.

Further, improved methods have been developed for the manufacture and fitting of lens made of hydrophilic hydrogel materials.

A full understanding of the invention may be had by reference to the following specification and the drawings, in which:

FIGURE 1 is a cross-section of a cornea with a lens fabricated in accordance with the disclosure of this invention as it is first placed in contact with the cornea;

FIGURE 2 is a cross-section of the lens showing its adherence to the cornea when in use;

FIGURE 3 is a front elevation of a lens shown in FIGURE 1;

FIGURE 4 is a cross-section of a soft lens having an insert of glass or other hard materials;

Figure 5:
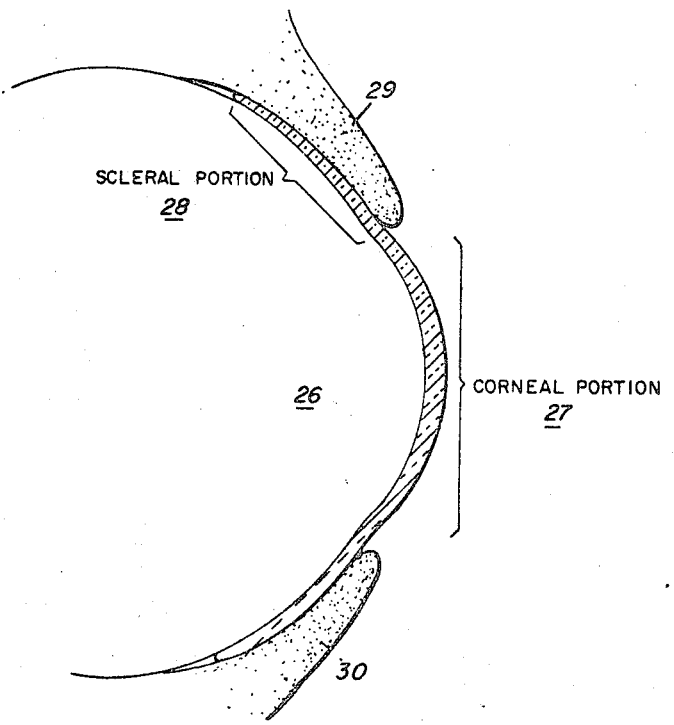
FIGURE 5 is a cross-section of a soft lens covering both the corneal and scleral area of the eye.

Referring to FIGURES 1 and 2, the lens is indicated generally by numeral 10 as being applied to an eye having a cornea 11 joined to the sclera 12 by the limbus 13 with the pupil 14 positioned behind the cornea with the iris 15 interposed therebetween.

A characteristic of the hydrophilic polymeric material disclosed in Patents Nos. 2,976,576 and 3,220,960 is that these materials are subject to an 18 percent linear expansion in all directions when passing from the dry hard state to the fully hydrated state in which the material is soft and flexible. This change should be taken into effect when the lens is formed; otherwise the usual optical considerations may be employed in determining the optical characteristics of the lens. The diameter of the lens will, of course, depend on the size of the cornea and will vary, in the case of a corneal lens, between 10.5 mm. and 13.5 mm. A further consideration is the fact that when the lens is formed, either by molding or lathing, the radius of curvature of the concave surface 16 in the hydrated state should be somewhat less than the radius of curvature of the cornea itself. The thickness of the lens in accordance with this embodiment of the invention is such that the peripheral margin 17 of the lens will be urged in a radially inward direction to act with a slight gripping action upon the cornea which, while not strong enough to deform the cornea to any observable extent, does assist in maintaining the lens in place. It is thought that this is due to the fact that if the over-all radius of the lens is greater than that of the cornea, the lens has a tendency to admit fluids into the rear of the lens underneath the marginal edges, which causes the lens to rock and move up and down when the eyelids blink. Further in order to provide a requisite flexibility to achieve this result, the thickness of the lens at the center should be in the neighborhood of between 0.25 mm. and 0.40 mm. in order to exert the proper gripping action and best results seem to occur with thickness between .25 mm to 0.30 mm.

The lenses made in accordance with this invention vary considerably from what one is accustomed to with hard contact lenses. In general, the lens conforms to the cornea, stretching and shaping itself to match the surface of the cornea. The thinner the lens, the more easily this stretching occurs. However, there are limits to the elasticity.

There is no tear layer under the lens as is commonly found with hard plastic contact lenses. There is an extremely thin layer of percorneal fluid that serves as a lubricating layer between the lens and the eye, but it is microscopic in thickness. The layer is difficult to see under the slit lamp because the indices of the plastic and cornea are close together.

With each blink of the eyelids, the percorneal fluid flows over the front surface of the lens and appears exactly as it does when flowing on the front surface of the cornea.

The force holding the lens on the cornea is determined by following variables: (a) The diameter of the lens, (b) the adhesion between the surfaces, (c) the relationship between the curve of the lens (soft) and the curve of the cornea (within limits, the greater the difference in curvature, the more "gripping" action occurs between the lens and the cornea), and (d) the thickness of the material also determines the above-mentioned force. The thicker the material is, the more memory force is involved in the stretching of the lens.

The rate of hydration depends on the thickness of the lens. However, an average lens will hydrate completely in a few minutes. During this transformation, the physical changes are as follows: (a) The material becomes soft and flexible, (b) the index of refraction changes from 1.52 to 1.42, (c) on full hydration, the water content of the lens is 55 percent by weight, and (d) every linear dimension increases by 18 percent.

Normally, when the lens is applied it should be first placed in a warm saline solution so that when it is brought in contact with the cornea, there will be no sudden shock due to difference in temperature. In placing the lens upon the eye, it may be removed from the saline solution with a pair of tweezers having rubber coated tips and placed upon the fingertip with the convex side 18 downward in a horizontal position so that the finger does not come in contact with the surface which will adhere to the cornea.

The lens can then be placed on the eye by bending the head forwardly and down. When the lens is first put on a cornea, an air bubble, such as is indicated by numeral 19, may be seen if the solution is lost as the lens lands. This may be the same type of air bubble created by a scleral lens when it goes onto the eye, or it may be the "space" created by the relative steepness between the lens and the cornea. In any event, it will disappear in two or three minutes. When these air bubbles were first observed (under the slit lamp), it was believed that each blink would cause a reduction in the size of the air bubble. It is not known whether it was being pumped or pushed out past the edge of the lens, or whether it was being absorbed into the lens material or onto the cornea. If the blink does pump it out past the edge, the bubble has not been observed to move in this fashion. The procedure is to use a curve steep enough to keep the lens centered and prevent its movement, but not so steep that the air bubble is too large and causes the irregular stretching in the center.

The "gripping" action of the lens to the cornea should not be very great. When the lens is pushed with the finger it should move or slide over the surface of the cornea as if it were lubricated. On the other hand it should have enough "gripping" action to resist movement caused by the blink of the eyelid. When this balance is achieved, the physiological results are excellent. There is no spectacle blur (after all day wearing) and no straining on the cornea at all. Eye movements are absolutely natural, and patients experience perfect comfort.

To remove the lens, it is slid off the cornea onto the sclera on the temporal side. At the same time, the gaze is directed nasally. The lens is pinched between the thumb and first finger. This allows air to get under the lens and it comes off easily. A patient learns to do this very quickly.

The visual performance of the lens is determined by the radius and optical quality of the front surface when the lens is in place on the cornea. To some extent it also depends on the centering of the lens on the cornea. As of now, the radius of curvature cannot be read in the soft state, but it is possible to make linear measurements in the soft state, that is, thickness, diameter, and optical zone size. However, research has shown that as the lens transforms from the hard state to the soft state, there is a consistent change of radius. There are certain physical changes that we know are definite concerning this transformation: (1) The index changes from 1.52 in the hard state to 1.42 in the fully hydrated state. (2) The lens swells and every linear dimension (including radius) is increased by 18 percent. This is called "transformation."

When the lens is fabricated in the hard state, the front surface is spherical. Upon hydration, it is still spherical with a change in curvature. Once the lens goes onto the cornea, the inside surface stretches itself to match the cornea, and this change is carried through the material to the front surface. Since the inside surface of the lens had multiple curves designed to approximate a parabola, the reforming of the front surface may result in a sphere or it may result in a front surface parabola. It is possible that this change in the front surface of the lens results in a decrease of the spherical aberrations of the eye. This may explain some of the unusual visual results. The total amount of the astigmatism on the cornea is rarely carried through the lens onto the front surface. The percentage varies, but it is common to measure only 1.00 dioptres or 1.25 dioptres on a cornea that has 2.00 dioptres of astigmatism. There are many variations of this effect. However, thicker lenses transfer less astigmatism to the front surface. Also the visual acuity seems to consistently be better than one might predict from the measured astigmatism on the front surface of the lens. This may be the result of a reduction of the spherical aberration of the eye by the lens. Otherwise, the physiological and metabolic condition of the eye is unaffected. Experience with wearing schedules have been most interesting. Because of the total lack of spectacle blur and the total lack of staining, patients have been into full time wear in two or three days with no ill effects. It may be that there is no physiological corneal adaptation required at all.

The refractive power required by a given patient can be calculated using the patient's "K" reading and refraction as is done with hard lenses. When the lens is "on K," the total refracting power of the lens should be equal to that required by the eye (with the lens in the soft state). Therefore, in fabricating the lens in the hard state, it is necessary to calculate backwards in order to compute the hard lens data. The two considerations are index change (1.52 to 1.42) and percentage of swelling (18 percent in every linear dimension including radius).

The power of the lens in the soft state can be measured by placing the hydrated lens on the convex curve of a glass lens with an 8.0 mm. front radius. This unit is then placed in a centrifuge and spun so that the centrifuge force presses the lens evenly on this 8.0 mm. surface. This will produce an optical front surface and this unit can then be placed in the lensometer and the lens can be measured.

For certain types of eye deficiency, it may be desirable to combine the wearability of the hydrogel material with certain optical qualities obtainable through the use of glass or other hard material. Such a composite contact lens is shown in FIGURE 4, in which it can be seen that there is provided an annular lens portion 20 having a central opening into which an insert, indicated generally by numeral 21, is inserted. The insert comprises a more or less cup shaped portion 22 composed, as well as the annular portion 20, of the hydrophilic hydrogel material. Embedded in the central front portion is a small button, or disc, of hard optical material 23 which may be glass or some other suitable plastic material.

The method employed to retain the insert in place takes advantage of the characteristic of the hydrogel material of undergoing expansion when passing from the dry to the hydrated state. In other words, if the dimensions of the insert is such as to precisely fit the opening in the annular portion when dry, the slight linear expansion of either or both portions of the lens when hydrated causes the insert to expand and the opening to contract a sufficient amount to retain the insert in place but without significant distortion of the lens at the point of junction. It may also be noted that at the rear end of the insert 22 it is provided with a radially outwardly extending bead 24 which is received in an annular recess 25 provided in the opening of the annular portion 20. Thus, the insert is positively prevented from falling out of the front of the lens and contact with the surface of the cornea prevents it from falling out the back. While it is preferable to insert the hard button 23 in the front of an hydrogel insert to prevent contact between the hard material and the cornea, it is conceivable that the entire insert might be composed of hard material. In FIGURE 4 the lens is shown in the dry state and the space between the insert and annular portions are exaggerated.

For almost all ordinary use there is sufficient adhesion between the hydrogel material and the cornea of an eyeball to securely hold the lens in place but it is possible that wearers engaged in strenuous activity such as athletics and so forth, might need some additional positive means to hold the lens on the eyeball, and for this purpose the form of the invention shown in FIGURE 5 may be preferable. In this modified form of the invention, the eyeball is represented generally by numeral 26 and is shown as being covered by a lens having a corneal portion 27 with an additional peripheral surrounding scleral portion 28 which fits at all times under the upper and lower lids 29 and 30, this lens does not differ in the corneal portion from those disclosed in the previous modification and it is evident that this modified form of lens could be provided with an insert such as that shown in FIGURE 4.

Figure 6:
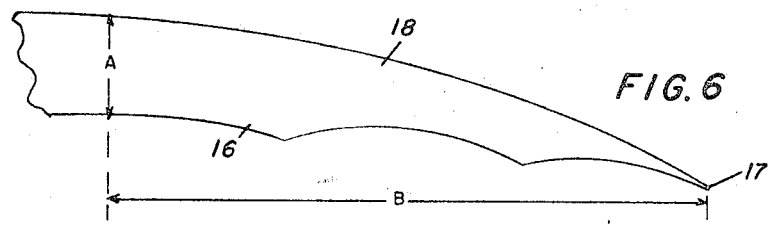
FIGURES 6 and 7 illustrate the method of forming the marginal edges of a lens composed of hydrophilic hydrogel material.
Figure 7:
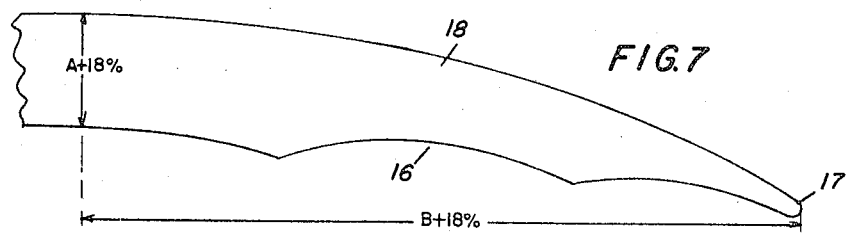
Figure 8:
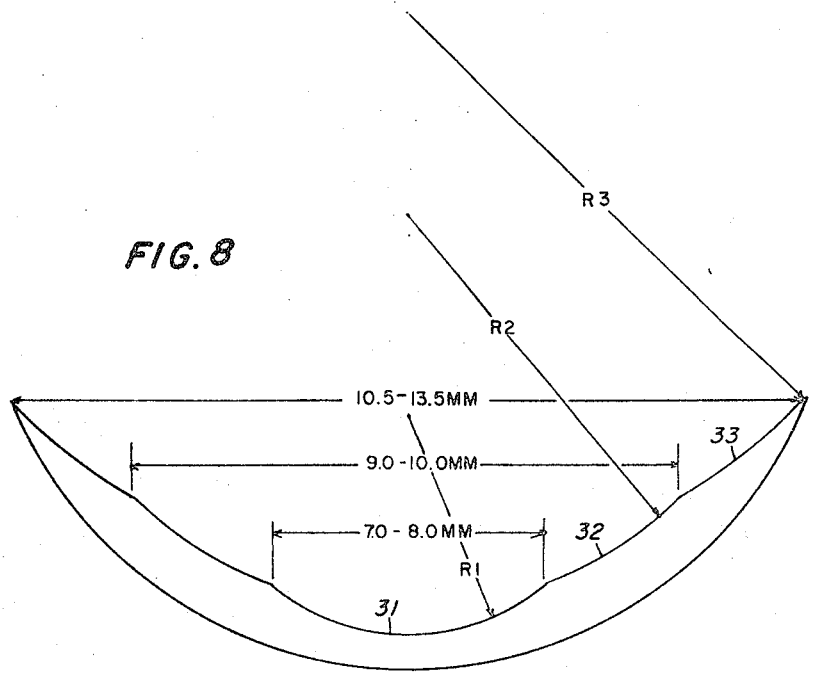
FIGURE 8 is a cross-section of a lens, on a greatly enlarged scale, showing the three radii of curvature used to obtain optical correction.

FIGURES 6 and 7 illustrate the method by which the peripheral margin 17 of the lens shown in FIGURES 1 and 2 may be formed. This method takes advantage of the fact that the hydrophilic hydrogel material disclosed in the previously mentioned patents and application expands linearly in all directions when passing from the dry state to the hydrated state, an amount equal to 18 percent.

In FIGURE 6 a typical lens is shown after it has been formed in the dry state to its final shape and it will be observed that the peripheral margin 17 has a sharp knife edge. Turning now to FIGURE 7, in which the lens is shown in its hydrated state, it will be observed that during the change from the dry to the wet state the marginal portion 17 has become smoothly rounded while the radius of the lens has increased as indicated by comparison shown between the line B in FIGURE 6 and the line B plus 18 percent of FIGURE 7. The result of this transformation is that when the lens is worn there is no irritation along the line where the margin of the lens contacts the cornea.

It has also been determined by clinical experiments that the concave surface of the corneal portion of lenses made in accordance with the teachings of this invention needs to be provided with concentric areas of curvature having only three differing radii, the diameters of the secondary and tertiary areas increasing successively in increments of 2.0 mm. over the diameter of the principal area of curvature, while the secondary and tertiary radii of curvature may increase in increments of approximately 1.00 mm. As an illustration of the ranges which may be employed, the principal area of curvature 31 may range between 7.0 mm. and 8.0 mm. and may have a radius of curvature $R^1$ varying between the limits of between 7.00 mm. and 8.00 mm. Similarly the diameter of the secondary area 32 may vary between the limits of 9.0 mm. and 10.0 mm. and have a radius of curvature varying between 7.60 mm. and 9.20 mm., while the tertiary area 33 may vary between the limits of 10.5 mm. and 13.5 mm. and have a radius of curvature varying between the limits of 8.20 mm. and 10.00 mm., all these values being those of the lens in the hydrated state.

It has also been found that approximately 80 percent of all patients may be fitted with these lenses by the use of a standard set of six lenses having the same diameters for the areas of curvature but differing radii. In the following table the specifications for this standard set of six lenses is set forth. In all of these lenses the total diameter of the lens, which is also the diameter of the tertiary area, is 12.0 mm., while the diameter of the principal area of curvature is 8.00 mm., and the diameter of the secondary area is 10.00 mm.

TABLE I

| Lens No.: | Diameters (in millimeters) | | |
|---|---|---|---|
| | Principal area of curvature 8.00 | Secondary area of curvature 10.00 | Tertiary area of curvature 12.00 |
| | Radii of Curvature (in millimeters) | | |
| I | 7.00 | 8.00 | 8.20 |
| II | 7.20 | 8.20 | 8.40 |
| III | 7.40 | 8.40 | 8.60 |
| IV | 7.60 | 8.60 | 8.80 |
| V | 7.80 | 8.80 | 9.00 |
| VI | 8.00 | 9.00 | 9.20 |

In the left-hand column there are listed the corresponding radii of curvature of the principal area for each of the six test lenses while in the middle column the corresponding radii of curvature of the secondary area is shown and in the right-hand column the corresponding radii of curvature for the tertiary area are listed.

With these lenses, it is possible to determine the proper radius for a given cornea which will accomplish the desired circumstances as described earlier in this application. This determination is made by applying the steepest curvature to the cornea which will still stretch out to match the cornea and hold the lens centered on the cornea. If a lens is applied to the cornea which is too steep, it can no longer stretch out to match it and this is easily determined because the pupillary region will show an optical "spot" which is dark and somewhat irregular when the pupillary reflex is viewed with a retinoscope. A lens having a longer radius of curvature on the concave surface will eliminate this "spot."

Some patients will require some variation of these dimensions requiring somewhat larger lenses or smaller lenses, or some curvature beyond the range as described in the table. These variations will be required because of some peculiarity of their lid action or because of an unusual shape to their cornea.

After the appropriate test lens has been found which can be worn by the patient without discomfort, a lens can then be formed based on the patient's optical prescription with the three appropriate radii of curvature of being used to form the areas of curvature corresponding in diameter to those of the test lens found most satisfactory with the patient.

In some cases it may be found that a lens ground to the patient's perscription results in excessive thickness in the central portion. This thickness must be reduced, or the patient will experience adverse visual and physiological affects. The thickness can be reduced, by a process illustrated in FIGURE 9. In this figure the convex front surface is indicated as Surface A while the principal, secondary and tertiary areas of curvature at the rear are indicated respectively by Surface B, Surface C and Surface D respectively. As is customary in the production of contact lenses, the loci of the radii of curvature are all located on a common axis but are spaced from each other along this axis. For example, the locus of the radius $R^1$, used in forming the principal area of curvature is located at 38' and the loci for the radii $R^2$ and $R^3$, when the lens has first been ground, are located respectively at 39' and 40'.

If the preliminary grinding results in a lens which is too thick, further grinding is continued on the convex surface so as to displace Surface A to the position of Surface F, while still having the same radius of curvature. An additional curve of longer radius must be added to the peripheral portion of this convex surface. This portion is known as the flange and is shown as Surface E. If this were not done, the continuation of the front surface would reduce the diameter, shown in dotted lines.

Figure 9:
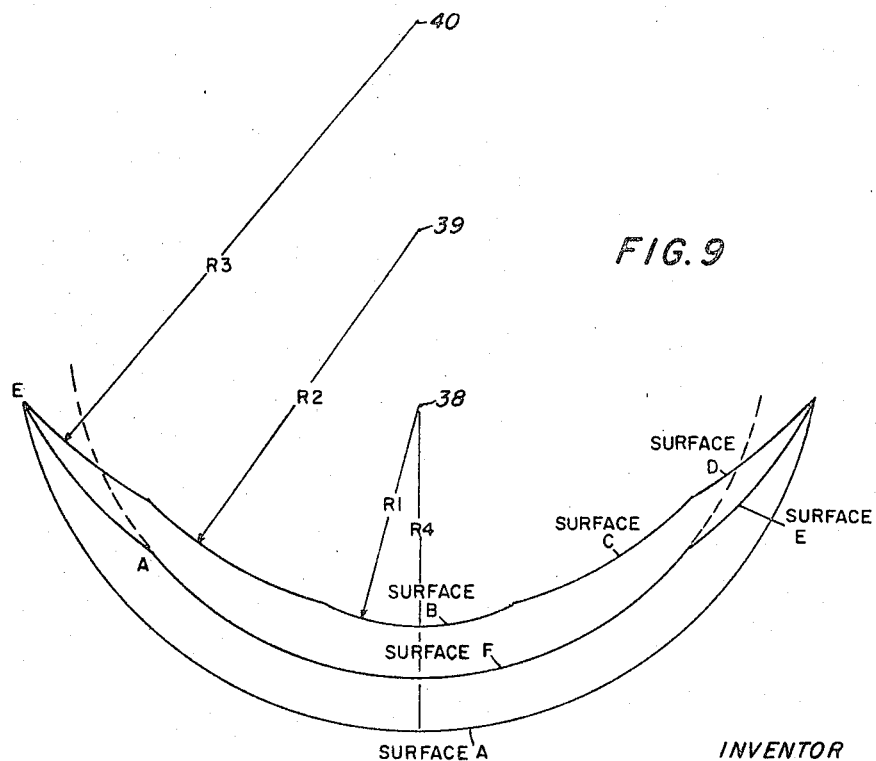
FIGURE 9 is a cross-section similar to FIGURE 8, but indicating the method for reducing the thickness of a lens while retaining strong optical correction.

It may be observed from FIGURE 9 that this additional grinding results in the removal of material around the periphery of the lens with no decrease in the over-all diameter of the lens. However, since the difference between the concave radius of curvature and the convex radius of curvature is the same, no change in refracting power will occur.

I claim:
1. A composite corneal contact lens comprising a concavo-convex body having two portions, one portion having a central aperture extending therethrough, the other portion comprising a generally cylindrical insert received in said aperture, the centrally apertured portion being composed of hydrophilic hydrogel material, the insert portion being composed of a hard optical material centrally embedded in hydrophilic hydrogel material, said hydrophilic hydrogel materials being capable of expansion in all directions in the transformation from a dry to a hydrated state, said insert being provided with a radially outwardly extending annular bead adjacent its rear concave face for engagement with a complementary annular recess provided in the rearmost portion of the aperture of said one portion, said insert having a precise fit with the aperture in the dry state, said bead and recess positively preventing forward movement of the insert, and said insert being further frictionally retained in said aperture, without the use of adhesive means, when the lens is hydrated.

References Cited

UNITED STATES PATENTS 2,117,770  5/1938  Row _____ 351—160
3,361,858  1/1968  Wichterle _____ 351—160 X

FOREIGN PATENTS 45,857  2/1966  Germany.

OTHER REFERENCES

Turner: "Hydrophilic Contact Lenses," article in Ophthalmic Optician, vol. 4, No. 8, Apr. 18, 1964, pp. 404–406 cited.

DAVID H. RUBIN, Primary Examiner

U.S. Cl. X.R.

351—177